United States Patent [19]
Wunder et al.

[11] Patent Number: 5,545,385
[45] Date of Patent: Aug. 13, 1996

[54] PROCESS FOR RECOVERING ALKALI METAL HYDROXIDE FROM ORGANIC LIQUORS

[75] Inventors: Heiko Wunder; Robert E. Scott-Young; Kenneth N. Maddern; Mark C. Corrigan, all of Tasmania, Australia

[73] Assignee: Amcor Limited, South Melbourne, Australia

[21] Appl. No.: 403,809

[22] PCT Filed: Sep. 30, 1993

[86] PCT No.: PCT/AU93/00499

§ 371 Date: May 3, 1995

§ 102(e) Date: May 3, 1995

[87] PCT Pub. No.: WO94/07797

PCT Pub. Date: Apr. 14, 1994

[30] Foreign Application Priority Data

Sep. 30, 1992 [AU] Australia .................................. PL5206

[51] Int. Cl.⁶ .............................. C22B 26/10; C01D 1/32
[52] U.S. Cl. .......................... 423/183; 423/198; 423/207; 423/DIG. 3
[58] Field of Search ..................... 423/198, 183, 423/DIG. 3, 207; 162/30.11

[56] References Cited

U.S. PATENT DOCUMENTS

| | | | |
|---|---|---|---|
| 4,000,264 | 12/1976 | Nagano et al. | 423/183 |
| 4,224,289 | 9/1980 | Covey et al. | 423/155 |
| 4,486,394 | 12/1984 | Nguyen et al. | 423/183 |
| 4,522,685 | 6/1985 | Feldmann | 423/DIG. 3 |

FOREIGN PATENT DOCUMENTS

| | | |
|---|---|---|
| 486132 | 4/1976 | Australia . |
| 519156 | 11/1981 | Australia . |
| 552973 | 6/1986 | Australia . |
| 599933 | 8/1990 | Australia . |
| 1171608 | 7/1984 | Canada . |
| 58-126391 | 7/1983 | Japan ........................... 423/183 |
| 59-146931 | 8/1984 | Japan ........................... 423/183 |
| 59-162129 | 9/1984 | Japan ........................... 423/207 |
| 60-02791 | 1/1985 | Japan ........................... 423/183 |
| 62-105919 | 5/1987 | Japan ........................... 423/183 |
| 2176470 | 12/1986 | United Kingdom . |
| 88/03191 | 5/1988 | WIPO . |

OTHER PUBLICATIONS

Patent Abstract of Japan, C-301, p. 63, JP,A, 60-81015 (Babcock Hitachi K. K.) 9 May 1985 (Aug. 5, 1985).

*Primary Examiner*—Steven Bos
*Attorney, Agent, or Firm*—Bell, Seltzer, Park & Gibson, P.A.

[57] ABSTRACT

The specification describes a process for recovering alkali metal hydroxides from an organic liquor such as black liquors derived from pulping wood chips. The organic liquor is burned in a fluidised bed combustion furnace containing fluidised particles of an iron rich mixed oxide of an alkali metal and iron. Particles of alkali metal ferrite are extracted from the furnace and dissolved in a solution of alkali metal hydroxide to form a more concentrated solution of alkali metal hydroxide and a precipitate of the iron rich mixed oxides of alkali metal and iron. A mixed oxide disclosed in the specification generally has the following formula: $NaFe_5O_8 \cdot 4H_2O$.

10 Claims, 1 Drawing Sheet

PROCESS FOR RECOVERING ALKALI METAL HYDROXIDE FROM ORGANIC LIQUORS

FIELD OF THE INVENTION

The present invention relates to the recovery of sodium hydroxide from organic liquors such as black liquor.

BACKGROUND OF THE INVENTION

Wood may be mechanically or chemically pulped. The chemical pulping processes normally employed are the sulphate, sulphite and soda pulping processes. The economics of these processes rely heavily on the recovery of chemicals employed in them.

In the sulphate process wood chips are digested in a solution of sodium hydroxide, sodium sulphide and possibly some sodium carbonate. In the sulphite process wood chips are cooked in the presence of sulphur dioxide and a bisulphite or a sulphite. In the soda process the wood chips are cooked in the presence of a solution of sodium hydroxide and possibly some sodium carbonate. The wood pulp is separated from the liquor. The liquor from the sulphate process and the soda process is normally referred to as black liquor. The present invention is concerned with the recovery of sodium hydroxide from black liquors derived from the soda process.

The specification of Australian Patent No. 486132 describes a method of recovering sodium hydroxide from black liquor which involves the following process steps:

1. concentrating the black liquor;
2. mixing ferric oxide with the condensed black liquor;
3. burning the mixture to produce sodium ferrite;
4. submerging the sodium ferrite in hot water to form sodium hydroxide and a precipitate of ferric oxide;
5. reusing the ferric oxide by mixing it with more condensed black liquor and repeating steps 3 and 4.

The specification of Australian Patent No. 519156 describes a process for recovering sodium hydroxide from black liquor which differs from the process described in Patent No. 486132 by the inclusion of a cold washing step. Sodium ferrite is washed in cold water to remove sodium chloride, sodium sulphate and other soluble impurities. The specification of Australian Patent No. 519156 also describes the use of a fluidised bed in the burning step.

The specification of Australian Patent No. 552973 describes a process similar to the process described in Australian Patent No. 519156 with the exception that it includes the step of agglomerating fines of ferric oxide and fines of sodium ferrite with black liquor before or during burning in a fluidised bed. The fines of ferric oxide are derived from the ferric oxide precipitated when sodium ferrite is added to warm water.

There are also a considerable number of Japanese patent applications that describe similar processes for recovering sodium hydroxide from black liquor. Some involve mixing the ferric oxide with the black liquor prior to combustion in a fluidised bed. Some involve combustion of the black liquor in a fluidised bed comprised of particles of ferric oxide or other transition metal oxide such as titanium dioxide. Some also involve combustion of black liquor in a fluidised bed comprised of another metallic oxide as well as ferric oxide. Sodium ferrite forms on the substrate oxide and the substrate oxide and ferric oxide are recovered when the agglomerate from the fluidised bed is added to hot water. The substrate oxides may be magnesia or alumina. However, only one patent specification describes the step of dissolving the sodium ferrite in an aqueous solution of sodium hydroxide. This is the specification of Australian Patent No. 599933. In a preferred form of this process the aqueous solution of sodium hydroxide has a concentration in the range from 10 to 150 gms per litre and more preferably 50 to 150 gms per litre. However, again the iron oxide recovered by the hydrolysis of the sodium ferrite is stated to be a mixture of hydrated iron oxide and unreacted iron oxide.

SUMMARY OF THE INVENTION

The present applicants discovered that when sodium ferrite is added to water the temperature of the water needs to be about 80° C. before the hydrolysis of the sodium ferrite commences at an economically satisfactory rate. However, at this temperature the rate of hydrolysis is so rapid that the temperature of the solution becomes uncontrollable and commences to boil. Consequently, an object of the present invention is to overcome this and other problems associated with practicing the inventions of the prior art. Accordingly, the present invention provides a method for recovering alkali metal hydroxide from an organic liquor which method comprises the following steps:

(i) fluidising particles of an iron rich mixed oxide of alkali metal and iron in a fluidised bed furnace;

(ii) burning in the fluidised bed furnace, an organic liquor derived from treatment of organic material with an alkali metal compound, to produce particles of alkali metal ferrite;

(iii) recovering the particles of alkali metal ferrite from the fluidised bed furnace; and cooling them to produce cooled particles of alkali metal ferrite;

(iv) mixing the cooled particles of alkali metal ferrite with an aqueous solution of alkali metal hydroxide at a temperature in excess of 80° C. to form a more concentrated solution of alkali metal hydroxide and a precipitate of the iron rich mixed oxide of alkali metal and iron;

(v) recovering the more concentrated solution of alkali metal hydroxide; and (vi) recovering the precipitate and feeding it to the fluidised bed furnace.

Prior to step (iv) the particles of alkali metal ferrite are preferably screened. Oversize particles are crushed and rescreened. Undersize particles may be ground to a fine dust suitable for agglomeration and returned to the fluidised bed furnace following agglomeration. Particles of a suitable size are then used in step (iv) of the process of the present invention. Particles having a size in a range from 0.5 to 3 mm are suitable.

The process is particularly suited to the recovery of sodium hydroxide from black liquors derived from the soda process. In this case the iron rich mixed oxide compound of iron and alkali metal is an iron rich mixed oxide compound of iron and sodium. The process may also be used to recover sodium hydroxide from other organic liquors that have been derived from treatment of an organio material with sodium compounds.

The iron rich mixed oxide compound of sodium and iron is predominantly a hydrated oxide having the following formula: $NaFe_5O_8 \cdot 4H_2O$. The oxide has a spinel like structure. The precipitation of this material in the process was unexpected and has a direct impact on the heat and mass balances that are a necessary step in designing a successful process plant. These balances are different to those that would arise from the teachings of the prior art.

The fluidised bed furnace may be operated at a temperature in the range between 850° C. and 980° C., but preferably it is operated at a temperature in the range from 890° C. to 930° C.

The bed is preferably fluidised with air which also provides oxygen for combusting organics contained in the black liquor. Organics in the black liquor are combusted and sodium present in the liquor combines with the iron rich mixed oxide to form sodium ferrite. At least six phases of sodium ferrite are known and furnace conditions are maintained such that the phases generated are economically leachable and do not form sticky deposits in the bed. In particular the presence of silica in haematite or magnetite used as make-up or start-up bed material may result in the formation of a type of sodium ferrite which is not readily hydrolysed. Preferably haematite or magnetite used as start-up or make-up bed material contains less than 3.5% by weight of silica. Calcium present in the bed may result in the formation of calcium ferrite which does not hydrolyse rapidly. Materials fed to the fluidised bed should also contain as little sulphur as possible. Sulphur combines with iron and sodium to form low melting point materials that can cause defluidisation.

Granular sodium ferrite is removed from the fluidised bed and cooled in a cooling bed. Cooled sodium ferrite is fed to a leaching vessel to extract sodium hydroxide therefrom.

The leaching reaction rate is temperature dependant and will not occur at a reasonable rate below 80° C. but once started the reaction is strongly exothermic and the heat release is difficult to control when carried out in hot water. However, it has been unexpectedly discovered that the leaching rate is significantly slower if the ferrite is immersed in a solution of caustic soda of concentration equal to or greater than 150 gms per litre. In addition, a solution of caustic soda of this or greater strength has a boiling point of approximately 108° C. or greater and thus there is a greater margin to prevent boiling than if the ferrite is added directly to water.

The addition of sodium ferrite to the solution of caustic soda causes the concentration of caustic soda to increase and a precipitate of a hydrated iron rich mixed oxide of sodium and iron to form. This mixed oxide typically has the formula $NaFe_5O_8 \cdot 4H_2O$. The mixed oxide is separated from the solution of caustic soda on a belt filter. The mixed oxide is recovered from the belt and returned to the fluidised bed combustion furnace.

A concentrated solution of caustic soda typically having a strength of about 250 to 300 gms per litre is recovered from the leaching vessel. The concentrated solution of caustic soda may be centrifuged to remove any suspended oxide particles and may then be treated to remove other trace elements. The concentrated solution of caustic soda called white liquor is then returned to the pulp mill.

Hot flue gas from the fluidised bed combustion furnace may be passed through a boiler and used to generate steam for process heat and to supply power to the plant.

Normally the flue gas is laden with a dust which is typically pure sodium ferrite. The dust may be collected dry e.g. in fabric filters, agglomerated using weak black liquor as a binder and returned to the furnace. The agglomerating process differs from other agglomerating processes because the dust can chemically react exothermically with a binder and depending on the conditions, prevent agglomeration. Consequently, in order to successfully agglomerate the dust, it should preferably first be cooled. In order to successfully agglomerate the dust with the liquor it is necessary to keep the temperature of the mixture below 70° C. by cooling the dust and/or binder prior to mixing. The cooled dust may then be mixed with weak black-liquor micro-granulated and fed to a pelletiser.

The invention also includes a process for agglomerating dust contained in a flue gas derived from a fluidised bed furnace used for recovering sodium hydroxide from black liquor which process comprises grinding the dust to the required particle size range, cooling the dust and/or black liquor prior to mixing, mixing metered quantities of the ground dust and black liquor into a microgranulator to form microgranules of the dust and agglomerating the microgranules on a pelletising pan to obtain the particle size required for the fluidised bed furnace.

Preferably the dust is ground to a size having an even distribution about a mean in the range from 25 to 30 micron. Dust ground to this size provides pellets of optimum strength and size. The pellet size required preferably lies in the range from 0.5 to 3 mm. If the proportion of bed material less than 0.5 mm in size increases beyond about 20%, the fluidised bed cannot be successfully operated. The finer material is prone to stick and leads to defluidisation of the bed. This is contrary to the teaching of the specification of Australian Patent No. 519156. The fluid bed will also not accommodate more than approximately 20% oversize material as this leads to segregation and defluidisation.

DETAILED DESCRIPTION OF THE PREFERRED EMBODIMENT

Figure 1:
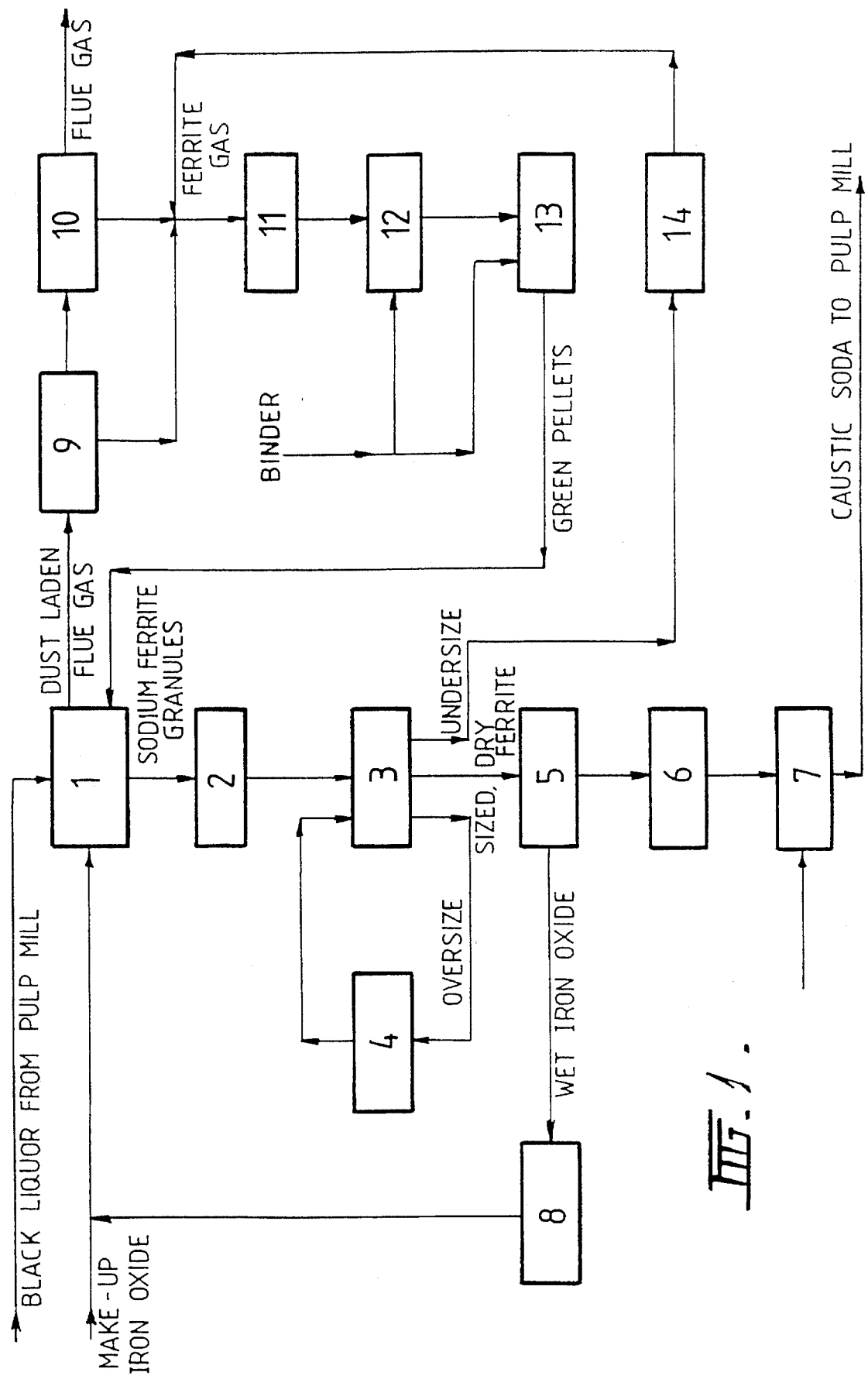

An embodiment of the process will now be described with reference to the accompanying drawing. Black liquor from a pulp mill is fed to a fluidised bed furnace (1).

Black liquor from a pulp mill is fed to a fluidised bed furnace. The fluidised bed comprises particles of an iron rich mixed oxide of sodium and iron. Particles of haematite or small quantities of magnetite may also be added as make up for iron lost in the process. The particles are fluidised by air which also provides oxygen for combustion of the organic material contained in the black liquor. The furnace is operated at a temperature of about 930° C. and a space velocity of about 0.2 metres/second above the minimum fluidisation velocity using sufficient air to maintain an excess of oxygen for burning the black liquor. Sodium ferrite Granules removed from the furnace are then cooled in a cooling bed (2) to a temperature of about 160° C.

The cooled particles of sodium ferrite are screened on screens (3). Oversized pellets are sent to a crusher (4) and recycled back to the screen (3). Undersized particles of sodium ferrite are sent to hammer mills (14) where they are ground to a fine dust.

Sodium ferrite particles of a suitable size are fed to a counter flow leaching vessel (5). A solution of sodium hydroxide having a concentration of about 100 gms per litre or higher is fed in to one end of the leaching vessel, and a solution of sodium hydroxide having a concentration of about 300 gms per litre is withdrawn from the opposite end of the counter flow leaching vessel. Concentrated sodium hydroxide removed from the leaching vessel (5) is then centrifuged in centrifuges (6) to remove suspended oxide. Thereafter the concentrated solution of caustic soda is passed to a settling vessel (7) from which the concentrated solution of caustic soda called white liquor is returned to the pulp mill.

A slurry of mixed oxide and sodium hydroxide is extracted from the opposite end of the leaching vessel from which the concentrated solution of caustic soda is extracted. The slurry is then filtered on a belt filter (8). Filtrate recovered from the belt filter is returned to the leaching vessel (5) and the precipitate of mixed oxide is returned to the fluidised bed furnace (1).

Dust laden flue gas from the fluidised bed combustion furnace (1) is passed through boiler (9) to recover heat from the flue gas. Steam generated in boiler (9) is then used to supply process heat and power for the plant. The flue dust is essentially pure sodium ferrite which is recovered in bag house (10) on fabric filters. Dust from the bag house is mixed with dust from the hammer mill (14) and cooled in dust cooler (11). The cooled dust is then mixed with weak black liquor and micro-granulated in a pre-mixer (12). Micro-granules from the pre-mixer (12) are fed on to a pelletising pan in the pelletiser (13) where a small fraction of black liquor is added to agglomerate the granules into pellets and densify them. The pellets are then returned to the fluidised bed combustion furnace (1) where they are calcined to form granules suitable for use in the leaching circuit.

The grinding of dust to a mean size of less than 50 micron using a suitable milling process has been found to be critical to successful pelletisation.

We claim:

1. A method for recovering alkali metal hydroxide from organic liquors with a high degree of accuracy in mass balance, energy balance, and their transfer, which method comprises the following steps:

(i) fluidising particles of a mixed oxide compound of alkali metal and iron in a fluidised bed furnace;

(ii) burning an organic liquor containing organic chemicals and an alkali metal compound in the fluidised bed furnace, to produce particles of alkali metal ferrite;

(iii) recovering the particles of the alkali metal ferrite from the fluidised bed furnace and cooling them to produce cooled particles of the alkali metal ferrite;

(iv) mixing the cooled particles of the alkali metal ferrite with an aqueous solution of an alkali metal hydroxide at a temperature in excess of 80° C., with the aqueous solution having a hydroxide concentration sufficient to control the reaction between the alkali metal ferrite and the aqueous solution of the alkali metal hydroxide at said temperature, to thereby increase the concentration of alkali metal hydroxide in the aqueous solution and to form a precipitate of the mixed oxide compound of alkali metal and iron;

(v) recovering the aqueous solution of alkali metal hydroxide; and (vi) recovering the mixed oxide compound precipitate and feeding it to the fluidised bed furnace.

2. A method according to claim 1 wherein the fluidised bed furnace is operated at a temperature in a range from 850° C. to 980° C.

3. A method according to claim 2, wherein the fluidised bed is operated at a temperature in a range from 890° C. to 930° C.

4. A method according to any one of the preceding claims wherein the alkali metal hydroxide is sodium hydroxide and the mixed oxide compound of iron and alkali metal is a mixed oxide compound of iron and sodium.

5. A method according to claim 1 wherein the organic liquor is black liquor derived from a soda process for pulping cellulosic materials wherein the cellulosic materials are cooked in a solution comprising sodium hydroxide.

6. A method according to claim 4, wherein the mixed oxide compound of sodium and iron is $NaFe_5O_8 \cdot 4H_2O$.

7. A process according to claim 1 wherein the more solution of alkali metal hydroxide resulting from step (iv) has a concentration in a range from 250 to 300 grams/litre.

8. A process according to claim 1 wherein the cooled particles of alkali metal ferrite are screened prior to step (iv) to provide particles of alkali metal ferrite of a size suitable for step (iv).

9. A process according to claim 1 wherein the aqueous solution of alkali metal hydroxide in step (iv) has an alkali metal hydroxide concentration equal to or greater than 150 gms per litre.

10. A process according to claim 5 wherein the solution for cooking the cellulosic materials further comprises sodium carbonate.

\* \* \* \* \*